United States Patent
Candelore et al.

(10) Patent No.: US 7,639,804 B2
(45) Date of Patent: Dec. 29, 2009

(54) RECEIVER DEVICE FOR STAR PATTERN PARTIAL ENCRYPTION

(75) Inventors: Brant L. Candelore, Escondido, CA (US); Henry Derovanessian, San Diego, CA (US); Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 193 days.

(21) Appl. No.: 11/713,859

(22) Filed: Mar. 5, 2007

(65) Prior Publication Data

US 2007/0269046 A1    Nov. 22, 2007

Related U.S. Application Data

(60) Division of application No. 10/273,903, filed on Oct. 18, 2002, now Pat. No. 7,302,059, which is a continuation-in-part of application No. 10/038,217, filed on Jan. 2, 2002, now Pat. No. 7,336,787, and a continuation-in-part of application No. 10/038,032, filed on Jan. 2, 2002, now Pat. No. 7,139,398, and a continuation-in-part of application No. 10/037,914, filed on Jan. 2, 2002, now Pat. No. 7,124,303, and a continuation-in-part of application No. 10/037,499, filed on Jan. 2, 2002, now Pat. No. 7,151,831, and a continuation-in-part of application No. 10/037,498, filed on Jan. 2, 2002, now Pat. No. 7,127,619.

(60) Provisional application No. 60/372,901, filed on Apr. 16, 2002, provisional application No. 60/355,326, filed on Feb. 8, 2002.

(51) Int. Cl.
      *H04N 7/167* (2006.01)
(52) U.S. Cl. .................. 380/200; 380/214; 380/210
(58) Field of Classification Search .............. None
      See application file for complete search history.

(56) References Cited

U.S. PATENT DOCUMENTS

| 4,881,263 A | 11/1989 | Herbison et al. |
| 4,964,126 A | 10/1990 | Musicus et al. |
| 5,151,782 A | 9/1992 | Ferraro |

(Continued)

FOREIGN PATENT DOCUMENTS

CA        2389247         5/2001

(Continued)

OTHER PUBLICATIONS

"MPEG-2 Transmission," Dr. Gorry Fairhurst, Jan. 2001.

(Continued)

*Primary Examiner*—Nasser G Moazzami
*Assistant Examiner*—Fikremariam Yalew
(74) *Attorney, Agent, or Firm*—Miller Patent Services; Jerry A. Miller

(57) ABSTRACT

A television signal receiver device consistent with certain embodiments has a receiver that receives a digital television signal including a plurality of unencrypted packets, and a plurality of encrypted packets, wherein the encrypted packets are of at least one selected packet type. The at least one selected packet type has packets occurring in a star pattern approximately situated at an upper center of an image. A decrypter decrypts the encrypted packets. A decoder decodes the unencrypted packets and the decrypted packets to produce a signal suitable for play on a television set. This abstract should not be considered limiting since embodiments consistent with the present invention may involve more, different or fewer elements.

23 Claims, 8 Drawing Sheets

U.S. PATENT DOCUMENTS

| | | |
|---|---|---|
| 5,414,852 A | 5/1995 | Kramer et al. |
| 5,477,263 A | 12/1995 | O'Callaghan et al. |
| 5,515,107 A | 5/1996 | Chiang et al. |
| 5,526,427 A | 6/1996 | Thomas et al. |
| 5,594,507 A | 1/1997 | Hoarty |
| 5,600,378 A | 2/1997 | Wasilewski |
| 5,629,866 A | 5/1997 | Carrubba et al. |
| 5,652,615 A | 7/1997 | Bryant et al. |
| 5,696,906 A | 12/1997 | Peters et al. |
| 5,726,702 A | 3/1998 | Hamaguchi et al. |
| 5,761,180 A | 6/1998 | Murabayashi et al. |
| 5,805,700 A * | 9/1998 | Nardone et al. ............. 380/217 |
| 5,835,668 A | 11/1998 | Yanagihara |
| 5,838,873 A | 11/1998 | Blatter et al. |
| 5,892,900 A | 4/1999 | Ginter et al. |
| 5,905,732 A | 5/1999 | Fimoff et al. |
| 5,917,830 A | 6/1999 | Chen et al. |
| 5,920,626 A | 7/1999 | Durden et al. |
| 5,943,605 A | 8/1999 | Koepele, Jr. |
| 5,973,726 A | 10/1999 | Iijima et al. |
| 6,005,940 A | 12/1999 | Kulinets |
| 6,057,832 A | 5/2000 | Lev et al. |
| 6,064,676 A | 5/2000 | Slattery et al. |
| 6,134,237 A | 10/2000 | Brailean et al. |
| 6,170,075 B1 | 1/2001 | Schuster et al. |
| 6,201,927 B1 | 3/2001 | Comer |
| 6,219,358 B1 | 4/2001 | Pinder et al. |
| 6,222,924 B1 | 4/2001 | Salomaki |
| 6,223,290 B1 | 4/2001 | Larsen et al. |
| 6,226,385 B1 | 5/2001 | Taguchi et al. |
| 6,314,111 B1 | 11/2001 | Nandikonda et al. |
| 6,327,421 B1 | 12/2001 | Tiwari et al. |
| 6,351,813 B1 | 2/2002 | Mooney et al. |
| 6,526,144 B2 | 2/2002 | Markandey et al. |
| 6,377,589 B1 | 4/2002 | Knight et al. |
| 6,418,169 B1 | 7/2002 | Datari |
| 6,424,717 B1 | 7/2002 | Pinder et al. |
| 6,452,923 B1 | 9/2002 | Gerszberg et al. |
| 6,453,116 B1 | 9/2002 | Ando et al. |
| 6,473,459 B1 | 10/2002 | Sugano et al. |
| 6,480,551 B1 | 11/2002 | Ohishi et al. |
| 6,490,728 B1 | 12/2002 | Kitazato et al. |
| 6,550,008 B1 | 4/2003 | Zhang et al. |
| 6,590,979 B1 | 7/2003 | Ryan |
| 6,621,866 B1 | 9/2003 | Florencio et al. |
| 6,621,979 B1 | 9/2003 | Eerenberg et al. |
| 6,640,305 B2 | 10/2003 | Kocher et al. |
| 6,643,298 B1 | 11/2003 | Brunheroto et al. |
| 6,697,489 B1 | 2/2004 | Candelore |
| 6,701,258 B2 | 3/2004 | Kramb et al. |
| 6,707,696 B1 | 3/2004 | Turner et al. |
| 6,788,882 B1 | 9/2004 | Geer et al. |
| 6,853,728 B1 | 2/2005 | Kahn et al. |
| 6,883,050 B1 | 4/2005 | Safadi |
| 6,925,180 B2 | 8/2005 | Iwamura |
| 6,988,238 B1 | 1/2006 | Kovacevic et al. |
| 7,039,802 B1 | 5/2006 | Eskicioglu et al. |
| 7,039,938 B2 | 5/2006 | Candelore |
| 7,055,166 B1 | 5/2006 | Logan et al. |
| 7,079,752 B1 | 7/2006 | Leyendecker |
| 7,089,579 B1 | 8/2006 | Mao et al. |
| 7,096,481 B1 | 8/2006 | Forecast et al. |
| 7,096,487 B1 | 8/2006 | Gordon et al. |
| 7,110,659 B2 | 9/2006 | Fujie et al. |
| 7,120,250 B2 | 10/2006 | Candelore |
| 7,124,303 B2 | 10/2006 | Candelore |
| 7,127,619 B2 | 10/2006 | Unger et al. |
| 7,139,398 B2 | 11/2006 | Candelore et al. |
| 7,146,007 B1 | 12/2006 | Maruo et al. |
| 7,151,831 B2 | 12/2006 | Candelore et al. |
| 7,151,833 B2 | 12/2006 | Candelore et al. |
| 7,155,012 B2 | 12/2006 | Candelore et al. |
| 7,158,185 B2 | 1/2007 | Gastaldi |
| 7,194,758 B1 | 3/2007 | Waki et al. |
| 7,221,706 B2 | 5/2007 | Zhao et al. |
| 7,292,692 B2 | 11/2007 | Bonan et al. |
| 7,336,785 B1 | 2/2008 | Lu et al. |
| 7,391,866 B2 | 6/2008 | Fukami et al. |
| 7,508,454 B1 | 3/2009 | Vantalon et al. |
| 2001/0013123 A1 | 8/2001 | Freeman et al. |
| 2002/0021805 A1 | 2/2002 | Schumann et al. |
| 2002/0044558 A1 | 4/2002 | Gobbi et al. |
| 2002/0056093 A1 | 5/2002 | Kunkel et al. |
| 2002/0066101 A1 | 5/2002 | Gordon et al. |
| 2002/0067436 A1 | 6/2002 | Shirahama et al. |
| 2002/0083439 A1 | 6/2002 | Eldering |
| 2002/0100054 A1 | 7/2002 | Feinberg et al. |
| 2002/0109707 A1 | 8/2002 | Lao et al. |
| 2002/0144116 A1 | 10/2002 | Giobbi |
| 2002/0144260 A1 | 10/2002 | Devara |
| 2002/0157115 A1 | 10/2002 | Lu |
| 2002/0194589 A1 | 12/2002 | Cristofalo et al. |
| 2002/0194613 A1 | 12/2002 | Unger |
| 2003/0021412 A1 | 1/2003 | Candelore et al. |
| 2003/0026423 A1 | 2/2003 | Unger et al. |
| 2003/0028879 A1 | 2/2003 | Gordon et al. |
| 2003/0034997 A1 | 2/2003 | McKain et al. |
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046687 A1 | 3/2003 | Hodges et al. |
| 2003/0123664 A1 | 7/2003 | Pedlow, Jr. et al. |
| 2003/0133570 A1 | 7/2003 | Candelore et al. |
| 2003/0152224 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0174837 A1 | 9/2003 | Candelore et al. |
| 2003/0174844 A1 | 9/2003 | Candelore |
| 2003/0188164 A1 | 10/2003 | Okimoto et al. |
| 2003/0190054 A1 | 10/2003 | Troyansky et al. |
| 2003/0222994 A1 | 12/2003 | Dawson |
| 2004/0037421 A1 * | 2/2004 | Truman ..................... 380/200 |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0064688 A1 | 4/2004 | Jacobs |
| 2004/0073917 A1 | 4/2004 | Pedlow, Jr. et al. |
| 2004/0083177 A1 | 4/2004 | Chen et al. |
| 2004/0086127 A1 | 5/2004 | Candelore |
| 2004/0088552 A1 | 5/2004 | Candelore |
| 2004/0088558 A1 | 5/2004 | Candelore |
| 2004/0151314 A1 | 8/2004 | Candelore |
| 2004/0158721 A1 | 8/2004 | Candelore |
| 2004/0165586 A1 | 8/2004 | Read et al. |
| 2004/0172650 A1 | 9/2004 | Hawkins et al. |
| 2004/0181666 A1 | 9/2004 | Candelore |
| 2004/0187161 A1 | 9/2004 | Cao |
| 2004/0240668 A1 | 12/2004 | Bonan et al. |
| 2004/0247122 A1 | 12/2004 | Hobrock et al. |
| 2004/0261099 A1 | 12/2004 | Durden et al. |
| 2004/0264924 A1 | 12/2004 | Campisano et al. |
| 2005/0015816 A1 | 1/2005 | Christofalo et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |

| | | | |
|---|---|---|---|
| 2005/0129233 A1 | 6/2005 | Pedlow, Jr. | |
| 2005/0141713 A1 | 6/2005 | Genevois | |
| 2005/0169473 A1 | 8/2005 | Candelore et al. | |
| 2005/0192904 A1 | 9/2005 | Candelore | |
| 2005/0198586 A1 | 9/2005 | Sekiguchi et al. | |
| 2005/0283797 A1 | 12/2005 | Eldering et al. | |
| 2006/0115083 A1 | 6/2006 | Candelore et al. | |
| 2006/0130119 A1 | 6/2006 | Candelore et al. | |
| 2006/0130121 A1 | 6/2006 | Candelore et al. | |
| 2006/0153379 A1 | 7/2006 | Candelore et al. | |
| 2006/0168616 A1 | 7/2006 | Candelore | |
| 2006/0174264 A1 | 8/2006 | Candelore | |
| 2006/0262926 A1 | 11/2006 | Candelore et al. | |
| 2006/0269060 A1 | 11/2006 | Candelore et al. | |
| 2007/0091886 A1 | 4/2007 | Davis et al. | |

FOREIGN PATENT DOCUMENTS

| | | | |
|---|---|---|---|
| EP | 0720374 | | 7/1996 |
| EP | 0382764 | | 4/1997 |
| JP | 07-046575 | | 2/1995 |
| KR | 299634 | | 8/2008 |
| WO | WO 93/09525 | * | 5/1993 |
| WO | WO 94/13081 | | 6/1994 |
| WO | WO 98/08341 | | 2/1998 |
| WO | WO 00/31964 | | 6/2000 |
| WO | WO 00/59203 | | 10/2000 |
| WO | WO 00/60846 | | 10/2000 |
| WO | WO 00/64164 | | 10/2000 |
| WO | WO 00/70817 | | 11/2000 |
| WO | WO 01/26372 | | 4/2001 |
| WO | WO 01/67667 | | 9/2001 |
| WO | WO 02/51096 | | 6/2002 |

OTHER PUBLICATIONS

All references of record in the parent U.S. Appl. No. 10/273,903, filed Oct. 18, 2002.

Microsoft Screen Shots and Help Files, Oct. 2001, Microsoft Windows XP, U.S. Appl. No. 10/634,546.

MPEG-2 Digital Broadcast Pocket Guide vol. 6, 2001, Acterna, LLC, U.S. Appl. No. 10/667,614.

"MPEG-2 Compliant Trick Play Over a Digital Interface," van Gassel et al., IEEE pp. 170-171., 2002.

"How Networks Work" Derfler and Freed, Ziff-Davis Press, 1996.

"How Computers Work—Millennium Edition," Ron White, Que Corporation, 1999.

"How The Internet Works—Millennium Edition," Preston Gralla, Que Corporation, 1999.

"Desktop Encyclopedia of the Internet," Nathan J. Muller, Artech House, 1999.

"K-Time Encryption for K-Time Licensing," Perkins, et al., IEEE, 2002.

"Partial Encryption of Compressed Images and Videos," Howard Cheng et al. IEEE 2000.

"Secure Transmission of MPEG Video Sources," Teixeira et al., date unknown.

Microsoft Windows XP, Microsoft, Screen Shots and Help Files, Oct. 27, 2001.

MPEG-2 Digital Broadcast Pocket Guide vol. 6, Acterna, LLC, Copyright 2001.

"DVB Conditional Access," David Cutts, Electronics and Communication Engineering Journal, Feb. 1997.

* cited by examiner

PAT                        PID=0x0000
Program 10, PMT PID=0100
Program 20, PMT PID=0200
Program 1010, PMT PID=1010
Program 1020, PMT PID=1020

— 138

PMT                       PID=0x0100
Program 10
Video ES PID=0101
Audio 1 ES PID=0102
Audio 2 ES PID=0103

140 —

PMT                       PID=0x0200
Program 20
Video ES PID=0201
Audio 1 ES PID=0202
Audio 2 ES PID=0203

— 142

SAMPLE TRANSPORT PSI

| | | | | |
|---|---|---|---|---|
| SH1 | MB1 | MB2 | ... | MB32 | MB33 |
| SH2 | MB1 | MB2 | ... | MB32 | MB33 |
| SH3 | MB1 | MB2 | ... | MB32 | MB33 |
| SH4 | MB1 | MB2 | ... | MB32 | MB33 |
| SH5 | MB1 | MB2 | ... | MB32 | MB33 |
| SH6 | MB1 | MB2 | ... | MB32 | MB33 |
| SH7 | MB1 | MB2 | ... | MB32 | MB33 |
| SH8 | MB1 | MB2 | ... | MB32 | MB33 |
| SH9 | MB1 | MB2 | ... | MB32 | MB33 |
| SH10 | MB1 | MB2 | ... | MB32 | MB33 |
| SH11 | MB1 | MB2 | ... | MB32 | MB33 |
| SH12 | MB1 | MB2 | ... | MB32 | MB33 |
| SH13 | MB1 | MB2 | ... | MB32 | MB33 |
| SH14 | MB1 | MB2 | ... | MB32 | MB33 |
| SH15 | MB1 | MB2 | ... | MB32 | MB33 |
| SH16 | MB1 | MB2 | ... | MB32 | MB33 |
| SH17 | MB1 | MB2 | ... | MB32 | MB33 |
| SH18 | MB1 | MB2 | ... | MB32 | MB33 |
| SH19 | MB1 | MB2 | ... | MB32 | MB33 |
| SH20 | MB1 | MB2 | ... | MB32 | MB33 |
| SH21 | MB1 | MB2 | ... | MB32 | MB33 |
| SH22 | MB1 | MB2 | ... | MB32 | MB33 |
| SH23 | MB1 | MB2 | ... | MB32 | MB33 |
| SH24 | MB1 | MB2 | ... | MB32 | MB33 |
| SH25 | MB1 | MB2 | ... | MB32 | MB33 |
| SH26 | MB1 | MB2 | ... | MB32 | MB33 |
| SH27 | MB1 | MB2 | ... | MB32 | MB33 |
| SH28 | MB1 | MB2 | ... | MB32 | MB33 |
| SH29 | MB1 | MB2 | ... | MB32 | MB33 |
| SH30 | MB1 | MB2 | ... | MB32 | MB33 |

250

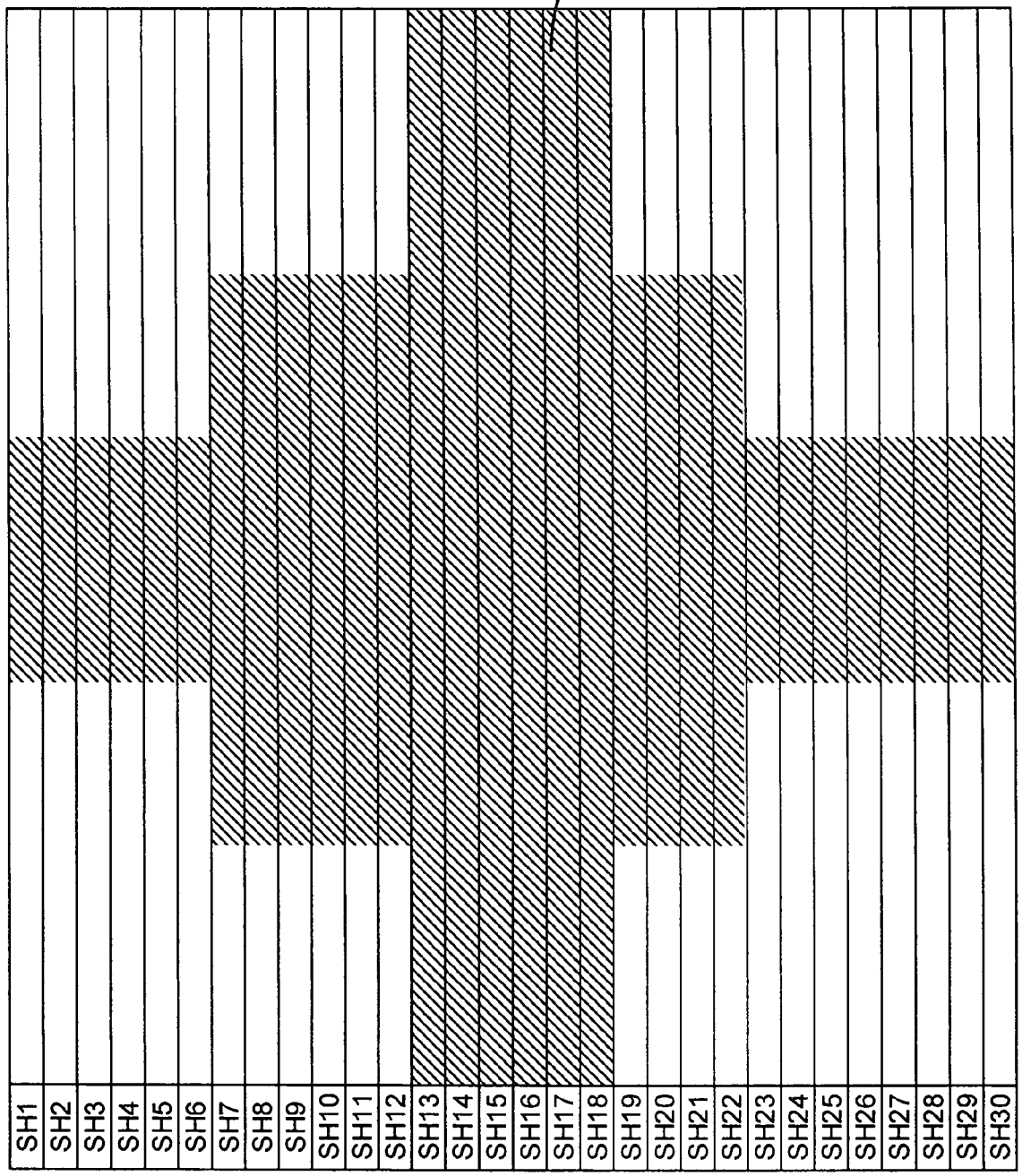

RECEIVER DEVICE FOR STAR PATTERN PARTIAL ENCRYPTION

CROSS REFERENCE TO RELATED DOCUMENTS

This application is a divisional application of application Ser. No. 10/273,903 filed Oct. 18, 2002, now U.S. Pat. No. 7,302,059 which is a continuation in part of patent applications entitled "Critical Packet Partial Encryption" to Unger et al., Ser. No. 10/038,217; now U.S. Pat. No. 7,336,787 patent applications entitled "Time Division Partial Encryption" to Candelore et al., Ser. No. 10/038,032; now U.S. Pat. No. 7,139,398 entitled "Elementary Stream Partial Encryption" to Candelore, Ser. No. 10/037,914; now U.S. Pat. No. 7,124,303 entitled "Partial Encryption and PID Mapping" to Unger et al., Ser. No. 10/037,499 now U.S. Pat. No. 7,151,831; entitled "Decoding and Decrypting of Partially Encrypted Information" to Unger et al., Ser. No. 10/037,498 now U.S. Pat. No. 7,127,619 all of which were filed on Jan. 2, 2002 and are hereby incorporated by reference herein; and, this application is also related to and claims priority benefit of U.S. Provisional patent application Ser. No. 60/372,901 filed Apr. 16, 2002, entitled "Method for Partially Scrambling Content by Encryption of Intracoded Macroblock in the Center of the TV Image" to Candelore, et al.; and U.S. Provisional patent application Ser. No. 60/355,326 filed Feb. 8, 2002, entitled "Analysis of Content Selection Methods", to Candelore. These applications are also hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of encryption. More particularly, this invention relates to a dual encryption method and apparatus particularly useful for scrambling packetized video content such as that provided by cable and satellite television systems.

BACKGROUND OF THE INVENTION

The above-referenced commonly owned patent applications describe inventions relating to various aspects of methods generally referred to herein as partial encryption or selective encryption. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 2 is an illustration of sample transport stream PSI consistent with certain embodiments of the present invention.

FIG. 5 illustrates the slice structure of a frame of video data consistent with certain embodiments of the present invention.

FIG. 6 illustrates a star pattern of encrypted packets consistent with certain embodiments of the present invention.

DETAILED DESCRIPTION OF THE INVENTION

Figure 1:
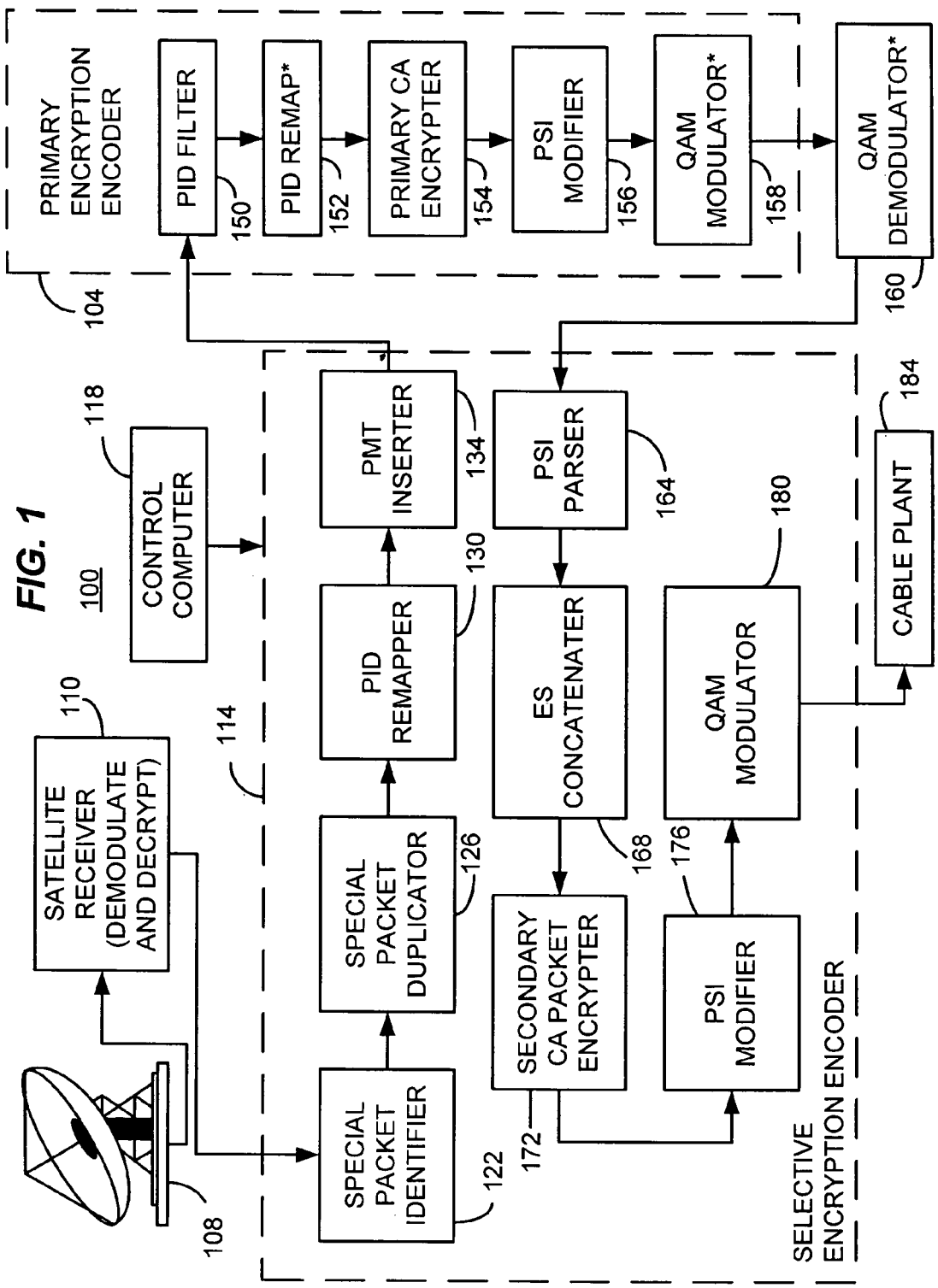
FIG. 1 is a block diagram of an exemplary cable system head end consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention. Partial encryption and selective encryption are used synonymously herein.

Turning now to FIG. 1, a head end 100 of a cable television system suitable for use in practicing a dual encryption embodiment of the present invention is illustrated. Those skilled in the art will appreciate that the present invention could also be implemented using more than two encryption systems without departing from the present invention. The illustrated head end 100 implements the dual partial encryption scenario of the present invention by adapting the operation of a conventional encryption encoder 104 (such as those provided by Motorola, Inc. and Scientific-Atlanta, Inc., and referred to herein as the primary encryption encoder) with additional equipment.

Head end 100 receives scrambled content from one or more suppliers, for example, using a satellite dish antenna 108 that feeds a satellite receiver 110. Satellite receiver 110 operates to demodulate and descramble the incoming content and supplies the content as a stream of clear (unencrypted) data to a selective encryption encoder 114. The selective encryption encoder 114, according to certain embodiments, uses two passes or two stages of operation, to encode the stream of data. Encoder 114 utilizes a secondary conditional access system (and thus a second encryption method) in conjunction with the primary encryption encoder 104 which operates using a primary conditional access system (and thus a primary encryption method). A user selection provided via a user interface on a control computer 118 configures the selective encryption encoder 114 to operate in conjunction with either a Motorola or Scientific Atlanta cable network (or other cable or satellite network).

It is assumed, for purposes of the present embodiment of the invention, that the data from satellite receiver 110 is supplied as MPEG (Moving Pictures Expert Group) compliant packetized data. In the first stage of operation the data is passed through a Special Packet Identifier 122. Special Packet Identifier 122 identifies specific programming that is to be dual partially encrypted according to the present invention. The Special Packet Identifier 122 signals the Special Packet Duplicator 126 to duplicate special packets. The Packet Identifier (PID) Remapper 130, under control of the computer 118, remaps the PIDs of the elementary streams (ES) (i.e., audio, video, etc.) of the programming that shall remain clear and the duplicated packets to new PID values. The payload of the elementary stream packets are not altered in any way by Special Packet Identifier 122, Special Packet Duplicator 126, or PID remapper 1306. This is done so that the primary encryption encoder 104 will not recognize the clear unencrypted content as content that is to be encrypted.

The packets may be selected by the special packet identifier 122 according to one of the selection criteria described in the above-referenced applications or may use another selection criteria such as those which will be described later herein. Once these packets are identified in the packet identifier 122, packet duplicator 126 creates two copies of the packet. The first copy is identified with the original PID so that the primary encryption encoder 104 will recognize that it is to be encrypted. The second copy is identified with a new and unused PID, called a "secondary PID" (or shadow PID) by the PID Remapper 122. This secondary PID will be used later by the selective encryption encoder 114 to determine which packets are to be encrypted according to the secondary encryption method. FIG. 2 illustrates an exemplary set of transport PSI tables 136 after this remapping with a PAT 138 defining two programs (10 and 20) with respective PID values 0100 and 0200. A first PMT 140 defines a PID=0101 for the video elementary stream and PIDs 0102 and 0103 for two audio streams for program 10. Similarly, a second PMT 142 defines a PID=0201 for the video elementary stream and PIDs 0202 and 0203 for two audio streams for program 20.

As previously noted, the two primary commercial providers of cable head end encryption and modulation equipment are (at this writing) Motorola, Inc. and Scientific-Atlanta, Inc. While similar in operation, there are significant differences that should be discussed before proceeding since the present selective encryption encoder 114 is desirably compatible with either system. In the case of Motorola equipment, the Integrated Receiver Transcoder (IRT), an unmodulated output is available and therefore there is no need to demodulate the output before returning a signal to the selective encryption encoder 114, whereas no such unmodulated output is available in a Scientific-Atlanta device. Also, in the case of current Scientific-Atlanta equipment, the QAM, the primary encryption encoder carries out a PID remapping function on received packets. Thus, provisions are made in the selective encryption encoder 114 to address this remapping.

In addition to the above processing, the Program Specific Information (PSI) is also modified to reflect this processing. The original, incoming Program Association Table (PAT) is appended with additional Program Map Table (PMT) entries at a PMT inserter 134. Each added PMT entry contains the new, additional streams (remapped & shadow PIDs) created as part of the selective encryption (SE) encoding process for a corresponding stream in a PMT of the incoming transport. These new PMT entries will mirror their corresponding original PMTs. The program numbers will be automatically assigned by the selective encryption encoder 114 based upon open, available program numbers as observed from the program number usage in the incoming stream. The selective encryption System 114 displays the inserted program information (program numbers, etc) on the configuration user interface of control computer 118 so that the Multiple System Operator (MSO, e.g., the cable system operator) can add these extra programs into the System Information (SI) control system and instruct the system to carry these programs in the clear.

Figure 3:
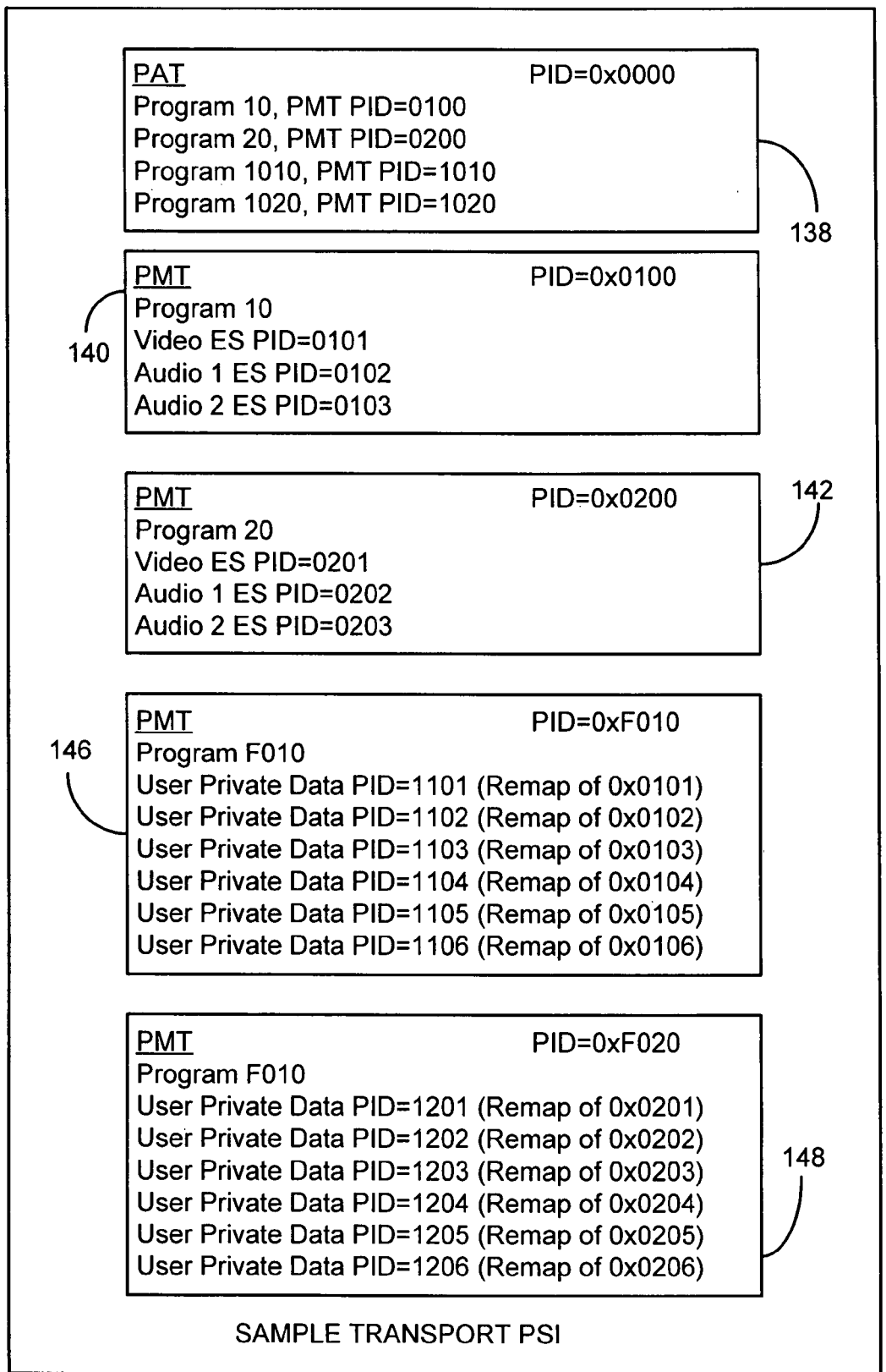
FIG. 3 is a further illustration of sample transport stream PSI consistent with certain embodiments of the present invention.

The modified transport PSI is illustrated as 144 in FIG. 3 with two additional temporary PMTs 146 and 148 appended to the tables of transport PSI 136. The appended PMTs 146 and 148 are temporary. They are used for the primary encryption process and are removed in the second pass of processing by the secondary encryption encoder. In accordance with the MPEG standard, all entries in the temporary PMTs are marked with stream type "user private" with an identifier of 0xF0. These PMTs describe the remapping of the PIDs for use in later recovery of the original mapping of the PIDs in the case of a PID remapping in the Scientific-Atlanta equipment. Of course, other identifiers could be used without departing from the present invention.

In order to assure that the Scientific-Atlanta PID remapping issue is addressed, if the selective encryption encoder 114 is configured to operate with a Scientific-Atlanta system, the encoder adds a user private data descriptor to each elementary stream found in the original PMTs in the incoming data transport stream (TS) per the format below (of course, other formats may also be suitable):

| Syntax | value | # of bits |
|---|---|---|
| private_data_indicator_descriptor( ) { | | |
| descriptor_tag | 0xF0 | 8 |

-continued

| Syntax | value | # of bits |
| --- | --- | --- |
| descriptor_length | 0x04 | 8 |
| private_data_indicator( ) { | | |
| orig_pid | 0x???? | 16 |
| stream_type | 0x?? | 8 |
| reserved | 0xFF | 8 |
| } | | |
| } | | |

The selective encryption encoder 114 of the current embodiment also adds a user private data descriptor to each elementary stream placed in the temporary PMTs created as described above per the format below:

| Syntax | value | # of bits |
| --- | --- | --- |
| private_data_indicator_descriptor( ) { | | |
| descriptor_tag | 0xF0 | 8 |
| descriptor_length | 0x04 | 8 |
| private_data_indicator( ) { | | |
| orig_pid | 0x???? | 16 |
| stream_type | 0x?? | 8 |
| reserved | 0xFF | 8 |
| } | | |
| } | | |

The "????" in the tables above is the value of the "orig_pid" which is a variable while the "??" is a "stream type" value. The data field for "orig_pid" is a variable that contains the original incoming PID or in the case of remap or shadow PIDs, the original PID that this stream was associated with. The data field "stream type" is a variable that describes the purpose of the stream based upon the chart below:

| Stream Type | Value |
| --- | --- |
| Legacy ES | 0x00 |
| Remapped ES | 0x01 |
| Shadow ES | 0x02 |
| Reserved | 0x03-0xFF |

These descriptors will be used later to re-associate the legacy elementary streams, which are encrypted by the Scientific-Atlanta, Inc. primary encryption encoder 104, with the corresponding shadow and remapped clear streams after PID remapping in the Scientific-Atlanta, Inc. modulator prior to the second phase of processing of the Selective Encryption Encoder. Those skilled in the art will appreciate that the above specific values should be considered exemplary and other specific values could be used without departing from the present invention.

In the case of a Motorola cable system being selected in the selective encryption encoder configuration GUI, the original PAT and PMTs can remain unmodified, providing the system does not remap PIDs within the primary encryption encoder. The asterisks in FIG. 1 indicate functional blocks that are not used in a Motorola cable system.

The data stream from selective encryption encoder 114 is passed along to the input of the primary encryption encoder 104 which first carries out a PID filtering process at 150 to identify packets that are to be encrypted. At 152, in the case of a Scientific-Atlanta device, a PID remapping may be carried out. The data are then passed along to an encrypter 154 that, based upon the PID of the packets encrypts certain packets (in accord with the present invention, these packets are the special packets which are mapped by the PID Remapper 130 to the original PID of the incoming data stream for the current program). The remaining packets are unencrypted. The data then passes through a PSI modifier 156 that modifies the PSI data to reflect changes made at the PID remapper. The data stream is then modulated by a quadrature amplitude modulation (QAM) modulator 158 (in the case of the Scientific-Atlanta device) and passed to the output thereof. This modulated signal is then demodulated by a QAM demodulator 160. The output of the demodulator 160 is directed back to the selective encryption encoder 114 to a PSI.

The second phase of processing of the transport stream for selective encryption is to recover the stream after the legacy encryption process is carried out in the primary encryption encoder 104. The incoming Program Specific Information (PSI) is parsed at 164 to determine the PIDs of the individual elementary streams and their function for each program, based upon the descriptors attached in the first phase of processing. This allows for the possibility of PID remapping, as seen in Scientific-Atlanta primary encryption encoders. The elementary streams described in the original program PMTs are located at PSI parser 164 where these streams have been reduced to just the selected packets of interest and encrypted in the legacy CA system format in accord with the primary encryption method at encoder 104. The elementary streams in the temporary programs appended to the original PSI are also recovered at elementary stream concatenator 168. The packets in the legacy streams are appended to the remapped content, which is again remapped back to the PID of the legacy streams, completing the partial, selective encryption of the original elementary streams.

The temporary PMTs and the associated PAT entries are discarded and removed from the PSI. The user private data descriptors added in the first phase of processing are also removed from the remaining original program PMTs in the PSI. For a Motorola system, no PMT or PAT reprocessing is required and only the final secondary encryption of the transport stream occurs.

During the second phase of processing, the SE encoder 114 creates a shadow PSI structure that parallels the original MPEG PSI, for example, having at PAT origin at PID 0x0000. The shadow PAT will be located at a PID specified in the SE encoder configuration as indicated by the MSO from the user interface. The shadow PMT PIDs will be automatically assigned by the SE encoder 114 dynamically, based upon open, available PID locations as observed from PID usage of the incoming stream. The PMTs are duplicates of the original PMTs, but also have CA descriptors added to the entire PMT or to the elementary streams referenced within to indicate the standard CA parameters and optionally, shadow PID and the intended operation upon the associated elementary stream. The CA descriptor can appear in the descriptor1( ) or descriptor2( ) loops of the shadow PMT. If found in descriptor1( ), the CA_PID called out in the CA descriptor contains the non-legacy ECM PID which would apply to an entire program. Alternatively, the ECM PID may be sent in descriptor2( ). The CA descriptor should not reference the selective encryption elementary PID in the descriptor1( ) area.

| CA PID Definition | Secondary CA private_data Value |
| --- | --- |
| ECM PID | 0x00 |
| Replacement PID | 0x01 |

-continued

| CA PID Definition | Secondary CA private_data Value |
|---|---|
| Insertion PID | 0x02 |
| ECM PID | undefined (default) |

This shadow PSI insertion occurs regardless of whether the selective encryption operation is for a Motorola or Scientific Atlanta cable network. The elementary streams containing the duplicated packets of interest that were also assigned to the temporary PMTs are encrypted during this second phase of operation at secondary packet encrypter in the secondary CA format based upon the configuration data of the CA system attached using the DVB (Digital Video Broadcasting) Simulcrypt™ standard.

The data stream including the clear data, primary encrypted data, secondary encrypted data and other information are then passed to a PSI modifier 176 that modifies the transport PSI information by deletion of the temporary PMT tables and incorporation of remapping as described above. The output of the PSI modifier 176 is modulated at a QAM modulator 180 and delivered to the cable plant 184 for distribution to the cable system's customers.

Figure 4:
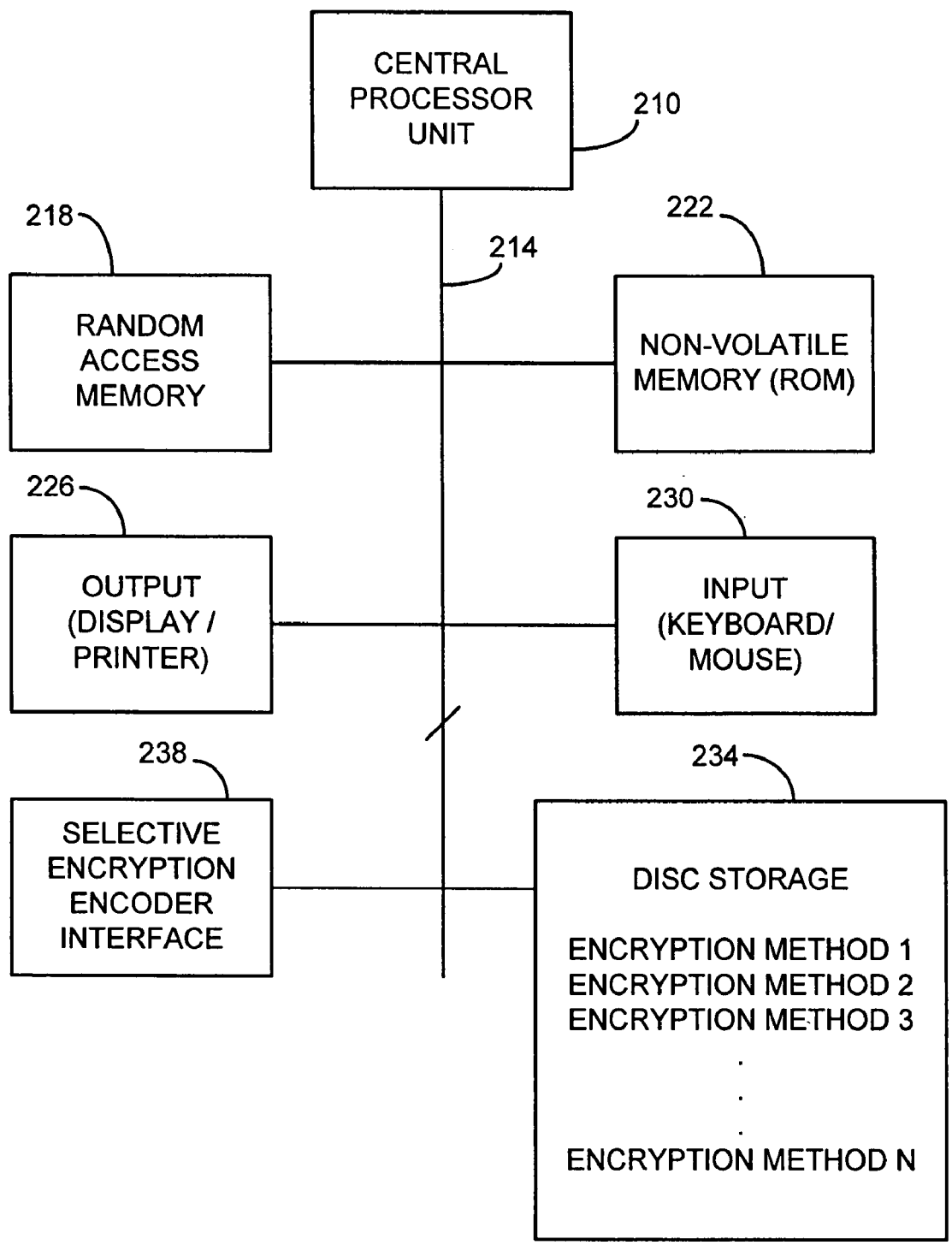
FIG. 4 is a block diagram of an illustrative control processor 100 consistent with certain embodiments of the present invention.

The control computer 118 may be a personal computer based device that is used to control the selective encryption encoder as described herein. An exemplary personal computer based controller 100 is depicted in FIG. 4. Control processor 100 has a central processor unit (CPU) 210 with an associated bus 214 used to connect the central processor unit 210 to Random Access Memory 218 and Non-Volatile Memory 222 in a known manner. An output mechanism at 226, such as a display and possibly printer, is provided in order to display and/or print output for the computer user as well as to provide a user interface such as a Graphical User Interface (GUI). Similarly, input devices such as keyboard and mouse 230 may be provided for the input of information by the user at the MSO. Computer 100 also may have disc storage 234 for storing large amounts of information including, but not limited to, program files and data files. Computer system 100 also has an interface 238 for connection to the selective encryption encoder 114. Disc storage 234 can store any number of encryption methods that can be downloaded as desired by the MSO to vary the encryption on a regular basis to thwart hackers. Moreover, the encryption methods can be varied according to other criteria such as availability of bandwidth and required level of security.

The partial encryption process described above utilizes any suitable conditional access encryption method at encrypters 154 and 172. However, these encryption techniques are selectively applied to the data stream using a technique such as those described below or in the above-referenced patent applications. In general, but without the intent to be limiting, the selective encryption process utilizes intelligent selection of information to encrypt so that the entire program does not have to undergo dual encryption. By appropriate selection of appropriate data to encrypt, the program material can be effectively scrambled and hidden from those who desire to hack into the system and illegally recover commercial content without paying. The MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data.

The MPEG specification defines a slice as " . . . a series of an arbitrary number of consecutive macroblocks. The first and last macroblocks of a slice shall not be skipped macroblocks. Every slice shall contain at least one macroblock. Slices shall not overlap. The position of slices may change from picture to picture. The first and last macroblock of a slice shall be in the same horizontal row of macroblocks. Slices shall occur in the bitstream in the order in which they are encountered, starting at the upper-left of the picture and proceeding by raster-scan order from left to right and top to bottom . . . ."

By way of example, to represent an entire frame of NTSC information, the frame (picture) is divided into 30 slices (but in general j slices may make up a full frame). Each slice contains 33 variable length macroblocks (but in general can include k variable length macroblocks) of information representing a 16×16 pixel region of the image. This is illustrated as frame 250 of FIG. 5 with each slice starting with a slice header (SH1-SH30) and each slice having 33 macroblocks (MB1-MB33). By appropriate selection of particular data representing the frame, the image can be scrambled beyond recognition in a number of ways as will be described below. By variation of the selection criteria for selective encryption, hackers can be thwarted on a continuing basis. Moreover, the selection criteria can be changed to adapt to bandwidth requirements as well as need for security of particular content (or other criteria).

It is noted that the portion of the picture that generally carries information of most interest to the viewer is approximately the center of the image. A suitable tradeoff between bandwidth and encryption security consistent with embodiments of the present invention involves encryption of selected portions of the image which can be deemed the "active region" of the image. This region is somewhat difficult to define and is somewhat content dependent. But, generally speaking it is approximately an upper central area of the frame. According to one embodiment consistent with the present invention, macroblocks in this active region are encrypted while macroblocks extending somewhat radially from this central region are encrypted with less frequency.

FIG. 6 illustrates an embodiment of the invention in which slices in a central area of the frame 270 are encrypted with a star pattern 274 extending outward radially from the upper center of the frame. In this embodiment, macroblocks having intracoded data are encrypted if they fall within the shaded area of the star pattern 274. In one embodiment consistent with the present invention, intracoded macroblocks are encrypted if, for standard definition, they fall within the definition of the star pattern 274 given in the table below:

| SLICE | ENCRYPTED INTRA-CODED MACROBLOCKS |
|---|---|
| 1-6 | 14-21 |
| 7-12 | 11-23 |
| 13-18 | 1-33 |
| 19-21 | 11-23 |
| 22-30 | 14-21 |

For an interlaced high definition video image, the video frame is made up of 68 slices each carrying 120 macroblocks. For such an image, the table below is one embodiment of how a star pattern can be realized:

| SLICE | ENCRYPTED INTRA-CODED MACROBLOCKS |
|---|---|
| 1-12 | 50-77 |
| 13-27 | 40-84 |
| 28-41 | 1-120 |
| 42-48 | 40-84 |
| 49-60 | 50-77 |

For a progressive high definition video image, the video frame is made up of 45 slices each carrying 80 macroblocks. For such an image, the table below is one embodiment of how a star pattern can be realized:

| SLICE | ENCRYPTED INTRA-CODED MACROBLOCKS |
|---|---|
| 1-9 | 34-51 |
| 10-18 | 26-56 |
| 19-27 | 1-80 |
| 28-31 | 26-56 |
| 32-45 | 34-51 |

Similar star patterns can be devised for any other video frame definition without departing from the invention. Moreover, variations of star patterns in which varying numbers of rays extend in various directions from a central or upper central area of the frame at various angles can be devised without departing from the invention.

As defined above, star pattern 274 is slightly asymmetrical with a weighting of the central area of the star being situated approximately one slice above center. Star pattern 274 has rays or points of the star extending vertically and horizontally across the entire frame. The star pattern 274 further has rays defined by the corners of the central region that extend diagonally outward from the center.

Those skilled in the art will understand that the above definition of the star pattern 274 is but one such definition within the scope of the invention. The number of intracoded macroblocks per slice or number of slices in a particular section of the star can be varied without departing from the present invention. Moreover, other star-like patterns can be used in place of the squared off pattern 274 depicted in FIG. 6, or the star pattern can be shifted within the image without departing from the invention. Such variations are considered equivalent and within the scope of the present invention so long as a central or active region of the image is encrypted with lower levels of encryption radiating outward from the active region.

Thus, in accordance with one embodiment consistent with the present invention, an packet containing an intra-coded macroblock in a star pattern such as that defined in the above table will be encrypted while the remaining packets will either be selectively encrypted according to another criterion, or transmitted in the clear. Depending upon the actual definition of the active region, the overhead required for dual encryption of a star pattern will vary. In other embodiments, all macroblocks within this star pattern can be encrypted.

In preferred embodiments, intra-coded macroblocks (or packets containing such macroblocks) are encrypted rather than all macroblocks within the star pattern, but this is not to be considered limiting. Intra-coded macroblocks contain anchor data such as absolute chrominance and/or luminance data used by inter-coded macroblocks to derive an image. By encryption of these intra-coded macroblocks, the inter-coded macroblocks are robbed of their point of reference and the image is substantially disrupted.

In this encryption technique, the active portion of the screen is deemed to be the area of most interest to the viewer. Although some intelligible video information may be present outside the star pattern, the encrypted star pattern is likely to produce a major annoyance to an unauthorized viewer. Moreover, the packetizing of the star pattern will likely result in additional data being encrypted. By encrypting the intra-coded blocks, inter-coded data will be deprived of a reference and thus produce the desired scrambling effect. This technique can be used alone or with other selective encryption techniques to produce low overhead encryption. Additionally, the present invention is suitable not only for multiple encryption scenarios, but also for single encryption of a video signal. In accordance with certain embodiments of the present invention, any technique that detects macroblocks containing intra-coded data within the star pattern can be used as a selection criterion for selecting data or data packets for encryption.

Multiple combinations of the encryption techniques are possible to produce encryption that has varying bandwidth requirements, varying levels of security and varying complexity. For example, the above star pattern could be encrypted along with packets containing slice headers, or the above star pattern could be encrypted along with packets containing slice headers and the first macroblock following each slice header.

Numerous other combinations of the above encryption techniques as well as those described in the above-referenced patent applications and other partial encryption techniques can be combined to produce a rich pallette of encryption techniques from which to select. In accordance with certain embodiments of the present invention, a selection of packets to encrypt can be made by the control computer 118 in order to balance encryption security with bandwidth and in order to shift the encryption technique from time to time to thwart hackers.

Figure 7:
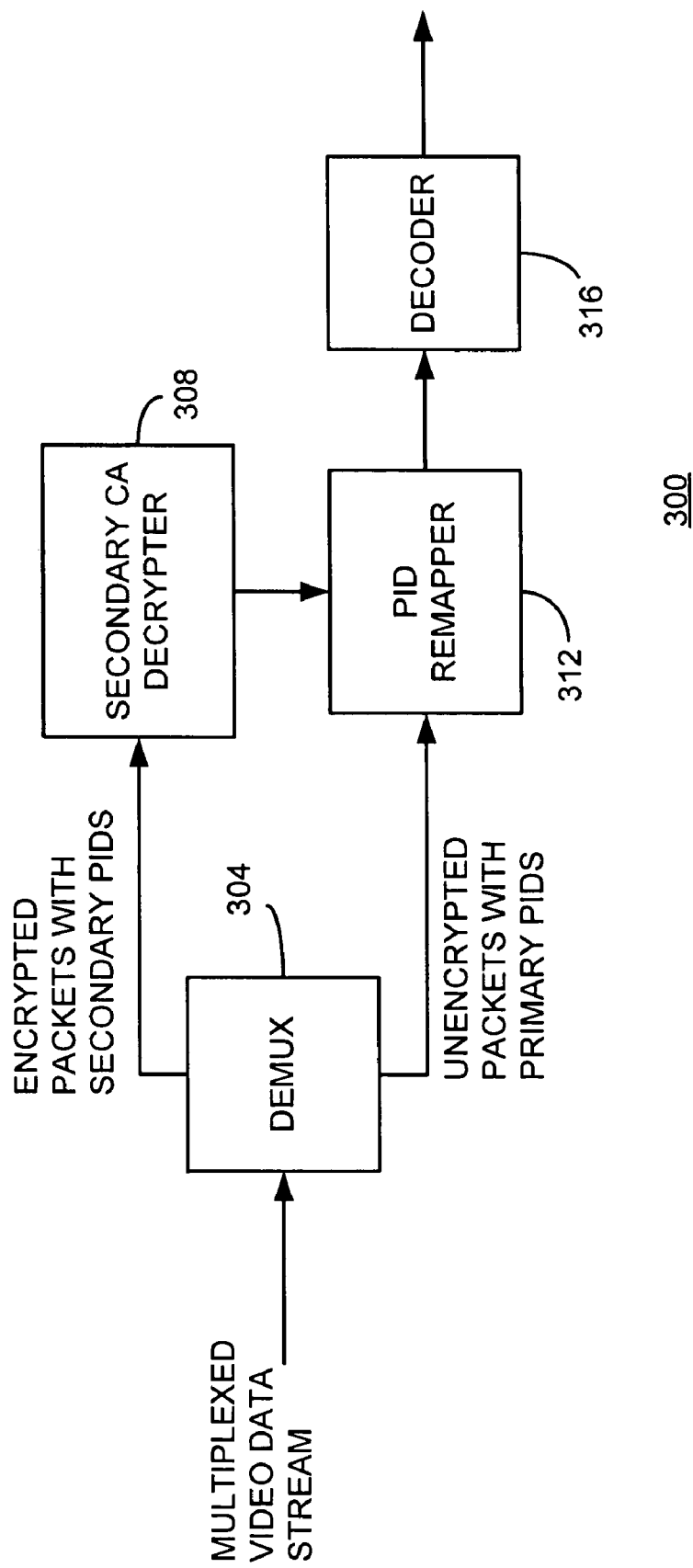
FIG. 7 illustrates a television Set-top box that decrypts and decodes in a manner consistent with certain embodiments of the present invention.

An authorized set-top box such as 300 illustrated in FIG. 7 operating under the secondary CA system decrypts and decodes the incoming program by recognizing both primary and secondary PIDs associated with a single program. The multiplexed video data stream containing both PIDs is directed to a demultiplexer 304. When a program is received that contains encrypted content that was encrypted by any of the above techniques, the demultiplexer directs encrypted packets containing encrypted content and secondary PIDS to a secondary CA decrypter 308. These packets are then decrypted at 308 and passed to a PID remapper 312. As illustrated, the PID remapper 312 receives packets that are unencrypted and bear the primary PID as well as the decrypted packets having the secondary PID. The PID remapper 312 combines the decrypted packets from decrypter 308 with the unencrypted packets having the primary PID to produce an unencrypted data stream representing the desired program. PID remapping is used to change either the primary or secondary PID or both to a single PID. This unencrypted data stream can then be decoded normally by decoder 316. Some or all of the components depicted in FIG. 7 can be implemented as program code running on a programmed processor running code stored on an electronic storage medium.

Figure 8:
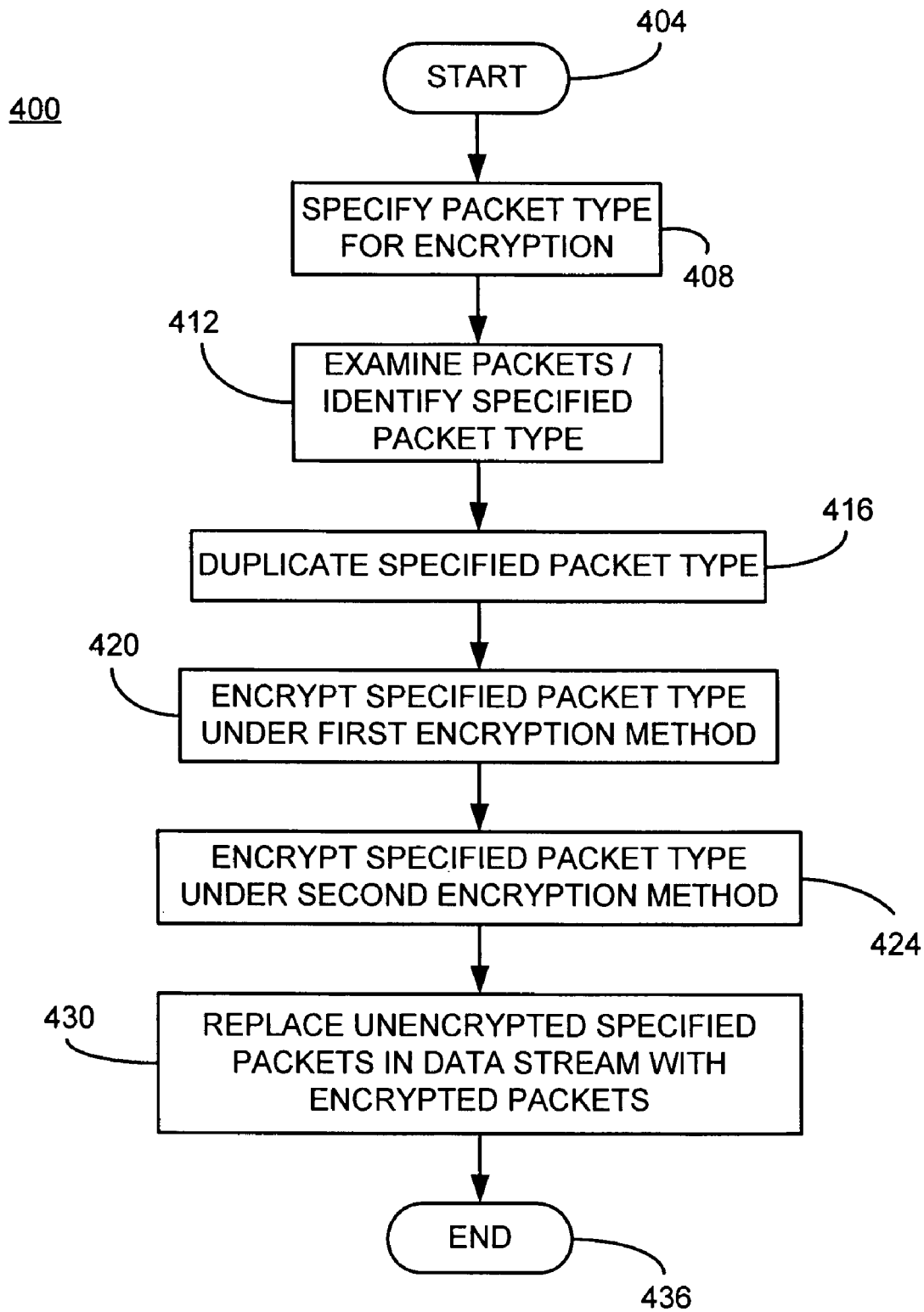
FIG. 8 is a flow chart broadly illustrating an encryption process consistent with embodiments of the present invention.

FIG. 8 is a flow chart 400 that broadly illustrates the encryption process consistent with certain embodiments of the present invention starting at 404. At 408 the packet type that is to be encrypted is specified. In accordance with certain embodiments consistent with the present invention, the selected packet type may be packets representing a star pattern in the video frame. Packets are then examined at 412 to identify packets of the specified type. At 416, the identified packets are duplicated and at 420 one set of these packets is encrypted under a first encryption method. The other set of identified packets is encrypted at 424 under a second encryption method. The originally identified packets are then replaced in the data stream with the two sets of encrypted packets at 430 and the process ends at 436.

While the above embodiments describe encryption of packets containing the selected data type, it is also possible to encrypt the raw data prior to packetizing without departing from this invention and such encryption is considered equivalent thereto.

Those skilled in the art will recognize that the present invention has been described in terms of exemplary embodiments based upon use of a programmed processor (e.g., processor 118, processors implementing any or all of the elements of 114 or implementing any or all of the elements of 300). However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in certain embodiments herein, is implemented using a programmed processor executing programming instructions that are broadly described above that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A television set-top box, comprising:
   a television receiver receiving a digital television signal comprising:
   a plurality of unencrypted packets; and
   a plurality of encrypted packets, wherein the encrypted packets are of at least one selected packet type and the at least one selected packet type comprises packets occurring in a star pattern situated at an upper center of an image where the star pattern has rays extending horizontally or vertically across a full width of the image;
   a decrypter that decrypts the encrypted packets; and
   a decoder that decodes the unencrypted packets and the decrypted packets to produce a signal suitable for play on a television set.

2. The television set-top box according to claim 1, wherein the specified packet type further comprises packets containing an intra-coded macroblock within the star pattern.

3. The television set-top box according to claim 1, wherein the star pattern is centered above a true center of the image.

4. The television set-top box according to claim 1, wherein the star pattern has rays extending horizontally across a full width of the image.

5. The television set-top box according to claim 1, wherein the star pattern has rays extending vertically across a full height of the image.

6. The television set-top box according to claim 1, wherein the star pattern has a rectangular central region centered approximately one slice above a center of the image.

7. A television signal receiver device, comprising:
   a television receiver receiving a digital television signal comprising:
   a plurality of unencrypted packets; and
   a plurality of encrypted packets, wherein the encrypted packets are of at least one selected packet type and the at least one selected packet type comprises packets occurring in a star pattern situated at an upper center of an image where the star pattern has rays extending horizontally or vertically across a full width of the image;
   a decrypter that decrypts the encrypted packets; and
   a decoder that decodes the unencrypted packets and the decrypted packets to produce a signal suitable for play on a television set.

8. The television signal receiver device according to claim 7, wherein the specified packet type further comprises packets containing an intra-coded macroblock within the star pattern.

9. The television signal receiver device according to claim 7, wherein the star pattern is centered above a true center of the image.

10. The television signal receiver device according to claim 7, wherein the star pattern has rays extending horizontally across a full width of the image.

11. The television signal receiver device according to claim 7, wherein the star pattern has rays extending vertically across a full height of the image.

12. The television signal receiver device according to claim 7, wherein the star pattern has a rectangular central region centered approximately one slice above a center of the image.

13. A television signal receiver device, comprising:
   A television receiver receiving a digital television signal comprising:
   a plurality of unencrypted packets; and
   a plurality of encrypted packets, wherein the encrypted packets are of at least one selected packet type and the at least one selected packet type comprises packets occurring in a star pattern situated at an upper center of an image, wherein the star pattern has a rectangular central region centered approximately one slice above a center of the image centered above a true center of the image and wherein the star pattern has rays extending horizontally across a full width of the image, and wherein the star pattern has rays extending vertically across a full height of the image;
      a decrypter that decrypts the encrypted packets; and
      a decoder that decodes the unencrypted packets and the decrypted packets to produce a signal suitable for play on a television set.

14. The television signal receiver device according to claim 13, wherein the specified packet type further comprises packets containing an intra-coded macroblock within the star pattern.

15. A television set-top box, comprising:
   a receiver receiving a digital television signal comprising:
   a plurality of unencrypted packets;
   a plurality of encrypted packets, wherein the encrypted packets are of at least one selected packet type and the at least one selected packet type comprises packets occurring in a star pattern situated at an upper center of an image;
      wherein a video frame comprises 30 slices each having 33 macroblocks, and wherein the star pattern is defined by: macroblocks 14-21 in slices 1-6 and 22-30, macroblocks 11-23 of slices 7-12 and 19-21 and macroblocks 1-33 of slices 13-18;
      a decrypter that decrypts the encrypted packets; and
      a decoder that decodes the unencrypted packets and the decrypted packets to produce a signal suitable for play on a television set.

16. A television set-top box, comprising:
   a receiver receiving a digital television signal comprising:
   a plurality of unencrypted packets;
   a plurality of encrypted packets, wherein the encrypted packets are of at least one selected packet type and the at least one selected packet type comprises packets occurring in a star pattern situated at an upper center of an image;
      wherein a video frame comprises 45 slices each having 80 macroblocks, and wherein the star pattern is defined by: macroblocks 34-51 in slices 1-9 and 32-45, macroblocks 26-56 of slices 10-18 and 28-31 and macroblocks 1-80 of slices 19-27;
      a decrypter that decrypts the encrypted packets; and
      a decoder that decodes the unencrypted packets and the decrypted packets to produce a signal suitable for play on a television set.

17. A television set-top box, comprising:
   a receiver receiving a digital television signal comprising:
   a plurality of unencrypted packets;
   a plurality of encrypted packets, wherein the encrypted packets are of at least one selected packet type and the at least one selected packet type comprises packets occurring in a star pattern situated at an upper center of an image;
      wherein a video frame comprises 68 slices each having 120 macroblocks, and wherein the star pattern is defined by: macroblocks 50-77 in slices 1-12 and 49-60, macroblocks 40-84 of slices 13-27 and 42-48 and macroblocks 1-120 of slices 28-41;
      a decrypter that decrypts the encrypted packets; and
      a decoder that decodes the unencrypted packets and the decrypted packets to produce a signal suitable for play on a television set.

18. A television signal receiver device, comprising:
   a television receiver receiving a digital television signal comprising:
   a plurality of unencrypted packets; and
      a plurality of encrypted packets, wherein the encrypted packets are of at least one selected packet type and the at least one selected packet type comprises packets occurring in a star pattern situated at an upper center of an image;
      wherein a video frame comprises 30 slices each having 33 macroblocks, and wherein the star pattern is defined by: macroblocks 14-21 in slices 1-6 and 22-30, macroblocks 11-23 of slices 7-12 and 19-21 and macroblocks 1-33 of slices 13-18;
      a decrypter that decrypts the encrypted packets; and
      a decoder that decodes the unencrypted packets and the decrypted packets to produce a signal suitable for play on a television set.

19. A television signal receiver device, comprising:
   a television receiver receiving a digital television signal comprising:
   a plurality of unencrypted packets; and
      a plurality of encrypted packets, wherein the encrypted packets are of at least one selected packet type and the at least one selected packet type comprises packets occurring in a star pattern situated at an upper center of an image;
      wherein a video frame comprises 45 slices each having 80 macroblocks, and wherein the star pattern is defined by: macroblocks 34-51 in slices 1-9 and 39-45 macroblocks 26-56 of slices 10-18 and 28-31 and macroblocks 1-80 of slices 19-27;
      a decrypter that decrypts the encrypted packets; and
      a decoder that decodes the unencrypted packets and the decrypted packets to produce a signal suitable for play on a television set.

20. A television signal receiver device, comprising:
   a television receiver receiving a digital television signal comprising:
   a plurality of unencrypted packets; and
      a plurality of encrypted packets, wherein the encrypted packets are of at least one selected packet type and the at least one selected packet type comprises packets occurring in a star pattern situated at an upper center of an image;
      wherein a video frame comprises 68 slices each having 120 macroblocks, and wherein the star pattern is defined by: macroblocks 50-77 in slices 1-12 and 49-60, macroblocks 40-84 of slices 13-27 and 42-48 and macroblocks 1-120 of slices 28-41;
      a decrypter that decrypts the encrypted packets; and
      a decoder that decodes the unencrypted packets and the decrypted packets to produce a signal suitable for play on a television set.

21. A television signal receiver device, comprising:
A television receiver receiving a digital television signal comprising:
a plurality of unencrypted packets; and
a plurality of encrypted packets, wherein the encrypted packets are of at least one selected packet type and the at least one selected packet type comprises packets occurring in a star pattern situated at an upper center of an image, wherein the star pattern has a rectangular central region centered approximately one slice above a center of the image centered above a true center of the image and wherein the star pattern has rays extending horizontally across a full width of the image, and wherein the star pattern has rays extending vertically across a full height of the image;
  wherein a video frame comprises 30 slices each having 33 macroblocks, and wherein the star pattern is defined by: macroblocks 14-21 in slices 1-6 and 22-30, macroblocks 11-23 of slices 7-12 and 19-21 and macroblocks 1-33 of slices 13-18;
  a decrypter that decrypts the encrypted packets; and
  a decoder that decodes the unencrypted packets and the decrypted packets to produce a signal suitable for play on a television set.

22. A television signal receiver device, comprising:
A television receiver receiving a digital television signal comprising:
a plurality of unencrypted packets; and
a plurality of encrypted packets, wherein the encrypted packets are of at least one selected packet type and the at least one selected packet type comprises packets occurring in a star pattern situated at an upper center of an image, wherein the star pattern has a rectangular central region centered approximately one slice above a center of the image centered above a true center of the image and wherein the star pattern has rays extending horizontally across a full width of the image, and wherein the star pattern has rays extending vertically across a full height of the image;
  wherein a video frame comprises 45 slices each having 80 macroblocks, and wherein the star pattern is defined by: macroblocks 34-51 in slices 1-9 and 32-45, macroblocks 26-56 of slices 10-18 and 28-31 and macroblocks 1-80 of slices 19-27;
  a decrypter that decrypts the encrypted packets; and
  a decoder that decodes the unencrypted packets and the decrypted packets to produce a signal suitable for play on a television set.

23. A television signal receiver device, comprising:
A television receiver receiving a digital television signal comprising:
a plurality of unencrypted packets; and
a plurality of encrypted packets, wherein the encrypted packets are of at least one selected packet type and the at least one selected packet type comprises packets occurring in a star pattern situated at an upper center of an image, wherein the star pattern has a rectangular central region centered approximately one slice above a center of the image centered above a true center of the image and wherein the star pattern has rays extending horizontally across a full width of the image, and wherein the star pattern has rays extending vertically across a full height of the image;
  wherein a video frame comprises 68 slices each having 120 macroblocks, and wherein the star pattern is defined by: macroblocks 50-77 in slices 1-12 and 49-60, macroblocks 40-84 of slices 13-27 and 42-48 and macroblocks 1-120 of slices 28-41;
  a decrypter that decrypts the encrypted packets; and
  a decoder that decodes the unencrypted packets and the decrypted packets to produce a signal suitable for play on a television set.

* * * * *